No. 859,628. PATENTED JULY 9, 1907.
J. W. SYKES.
METHOD OF RECLAIMING LAND.
APPLICATION FILED APR. 20, 1907.
2 SHEETS—SHEET 2.
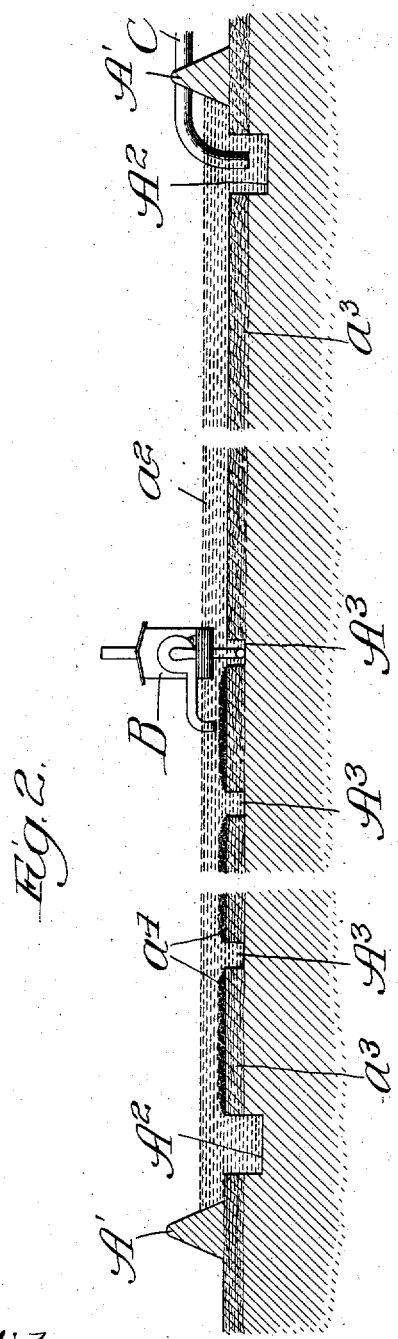
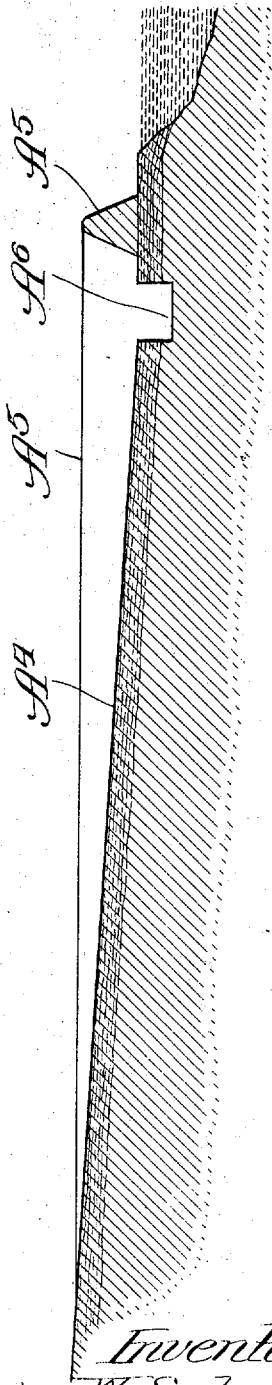
Witnesses:
Inventor:
John W. Sykes

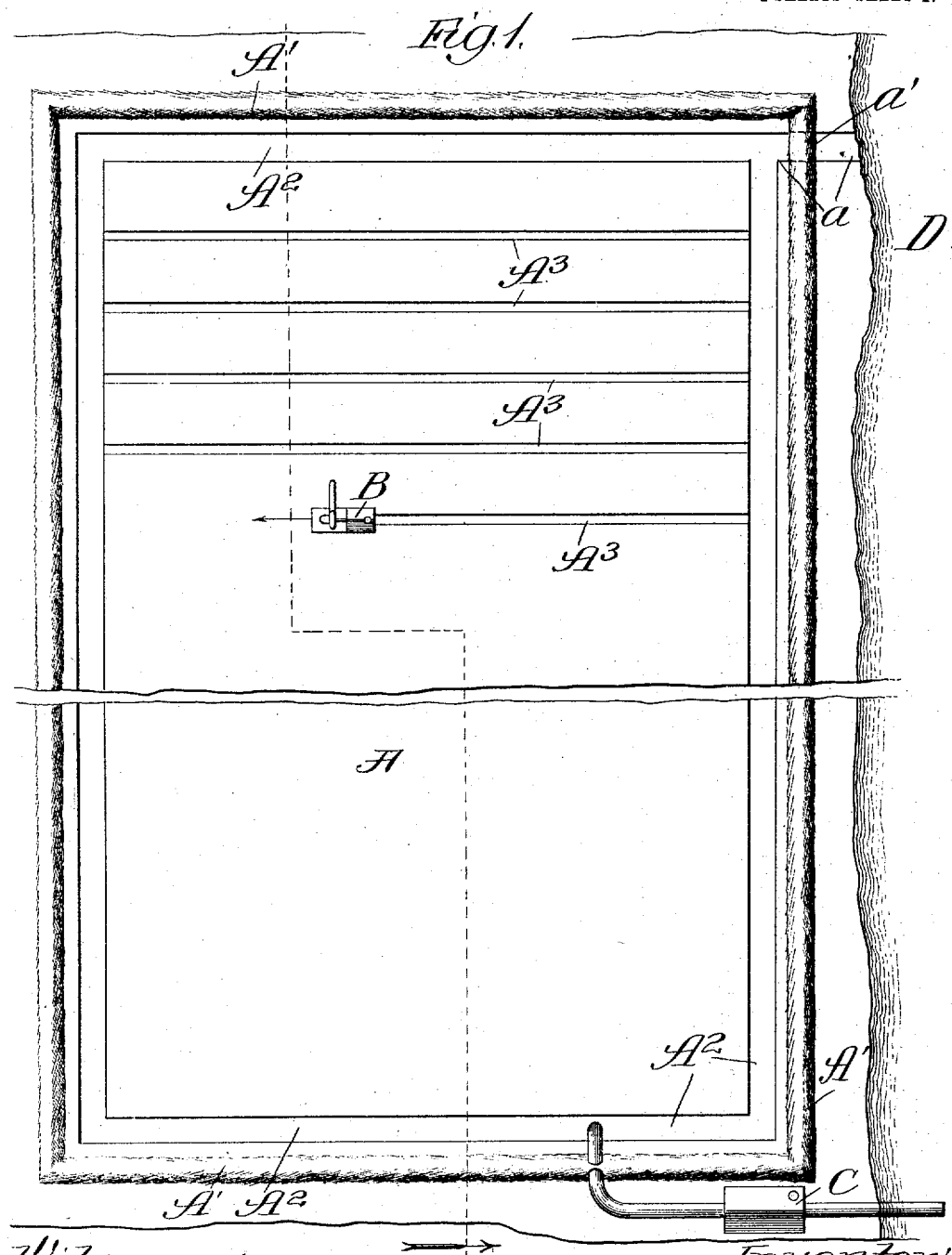

UNITED STATES PATENT OFFICE.

JOHN W. SYKES, OF CHICAGO, ILLINOIS.

METHOD OF RECLAIMING LAND.

No. 859,628.

Specification of Letters Patent.

Patented July 9, 1907.

Application filed April 20, 1907. Serial No. 369,333.

*To all whom it may concern:*

Be it known that I, JOHN W. SYKES, a citizen of the United States, residing at Chicago, in the county of Cook and State of Illinois, have invented a new and useful Improvement in Methods of Reclaiming Land, of which the following is a specification.

My invention relates particularly to a method of reclaiming swamp-lands or lowlands; and my primary object is to provide a method whereby such lands may be reclaimed at moderate expense.

As is well known, there are hundreds of thousands of acres of lowlands in the southern part of the United States which have heretofore been irreclaimable, because of the lack of any practicable method of effecting drainage, except at a prohibitive expense. Such lands, when reclaimed, are very valuable because of the exceedingly rich soil which they possess.

According to my method, in effecting reclaiming of lowlands having a soil saturated with water, or where the surface of the soil is covered with only a few inches of water, the section of land to be reclaimed is surrounded by a dike or levee with a canal adjacent thereto, the inclosure is then flooded with water to a sufficient depth to float a dredge-scow, after which the land is cut by small parallel drainage ditches connecting with the large canals adjacent to the dikes. The water is then drawn off, and the land is ready for tillage. In cases where the land is naturally flooded to a sufficient depth to support a dredge boat, the dike is built, small drainage channels are cut, and the water is then withdrawn from the inclosure.

I have illustrated my process in the accompanying drawing, in which

Figure 1 represents a plan view of a section of land under process of reclaiming; Fig. 2 represents a broken sectional-view taken as indicated at line 2 of Fig. 1; and Fig. 3 represents a sectional-view, illustrating a situation where the land is sloping and where it suffices to provide a dike at three sides of the inclosure.

Referring to the drawing, A represents an inclosed section of land surrounded by a dike or levee A' adjacent to which is a main ditch or canal $A^2$; $A^3$ represents a series of parallel small drainage ditches communicating with the main canal; B represents a dredge employed in cutting the small drainage ditches; and C represents a pumping-plant which may be employed either to flood the inclosure or to remove the water in case of necessity.

I have illustrated the position where a section of land adjacent to a river D is to be reclaimed. In such case, a dredge-boat may enter from the river, cutting its own channel $a$, and continuing, cutting the canal $A^2$ and building the dike A'. The dike A' may be constructed according to any approved method of dike construction. In practice, the peat or layer of decayed vegetable matter which constitutes the top layer of the earth is removed so that a clay formation may be employed in the dike construction, the peat formation serving to aid in retaining the clay in place. It is unnecessary to enter into details of the dike construction in the present application. After the completion of the dike, the channel $a$ is closed as indicated at $a'$ to complete the inclosure. The channel $A^2$ is commonly of greater width than the dredge-boat, and the dredge-boat floats on the water in said channel while the work of cutting the channel progresses. In the operation of cutting the small drainage channels $A^3$, it is necessary for the boat to float upon water covering the ground, and for this purpose the inclosure is filled with water to sufficient depth to float the boat, the water-level being indicated in Fig. 2 by $a^2$. Any suitable dredge may be employed for digging the small drainage channels. The dredge which I prefer to use is a suction-dredge, by means of which the layer of earth which is composed largely of decayed vegetable matter may be sucked up as the dredge-boat moves over its course and discharged over the area between the small ditches, thus obviating the establishment of banks which might prevent water from gaining ready access to the small drainage channels and at the same time rendering tillable all of the land between the drainage ditches. In Fig. 2, $a^3$ represents the earth layer which is composed largely of decayed vegetable matter, and $a^4$ represents the layer of material which is distributed over the surface between the small drainage channels.

In Fig. 3, $A^4$ represents the sloping surface of ground which is to be reclaimed, and $A^5$ represents a dike constructed about three sides of the ground which is to be reclaimed, there being adjacent to the dike the canal $A^6$. When the inclosure is flooded to a sufficient depth to float a dredge-boat the small drainage ditches may be cut in the manner already described.

It is observed that once the dike is constructed, the work of cutting the small drainage channels may be performed at a very rapid rate, as my method renders it unnecessary to remove any more material in forming the small drainage channels than is necessary for drainage purposes. Thus, it is unnecessary to cut a channel of sufficient width and depth to float the dredge boat, as is the case when the main dike is being constructed under ordinary conditions. Inasmuch as it is desirable ordinarily to space the small drainage channels about 150 feet to 200 feet apart, an understanding of the immense value of my process may be reached.
The method provides a way in which lands which are worth, when reclaimed, from $100 to $400 per acre may be reclaimed at a comparatively insignificant cost per acre. It should be added that in locations where my process will ordinarily be employed, the dike construction is commonly a necessity, inasmuch as these lands frequently lie practically at sea-level, and in some instances below sea-level. The work of constructing the dikes, therefore, is not to be considered as a useless thing, inasmuch as the dike, which serves during the process of reclaiming in retaining the water, serves after said process is completed in excluding the water which would otherwise flood the land.

It is noteworthy that my process provides for the use of heavy and powerful machinery which otherwise could not be used on lands of marshy, soft, or miry character, thereby enabling the work to be done at a very rapid rate, this element of time-saving being doubly important because of the liability of the drainage ditches to become filled before the work can be completed to such an extent as to allow the water to be drawn off so that the ground will assume the necessary stability to prevent the natural filling in of the drainage ditches which would otherwise occur. Thus, an undertaking, which, under old methods, is slow, laborious and very expensive and uncertain, is, under the new process, an easy and certain undertaking of relatively insignificant expense.

It is obvious that my method is available for the purpose of re-digging or cleaning out old ditches, which is desirable from time to time; hence, the appended claims are to be broadly construed to cover my method for such purpose, as well as the purpose of cutting original drainage-channels.

What I regard as new, and desire to secure by Letters Patent, is—

1. The method of reclaiming land, which consists in constructing a dike to form an inclosure, employing a dredge-boat supported upon water covering the land and cutting drainage channels, and then removing the water which served, during the process of cutting the drainage channels, from the surface of the land.

2. The method of reclaiming land which consists in floating dredging-apparatus upon water covering the surface of the land, cutting drainage channels in the land by means of said dredging-apparatus, and afterwards withdrawing the water from the submerged land.

3. The method of reclaiming land which consists in constructing a dike to maintain water upon the surface of the land, covering the land to be reclaimed with water of sufficient depth to support a dredge-boat, floating a dredge-boat upon the water and cutting drainage channels in the land, and then withdrawing the water submerging the land.

4. The method of reclaiming land which consists in constructing a dike to form an inclosure with a main channel at the inner side of the dike, floating dredging-apparatus upon water covering the land and cutting therewith small drainage channels in the land and intersecting the main channel, and then withdrawing the water which submerges the land.

5. The method of reclaiming land which consists in constructing a dike for retaining water upon the land and providing a main channel within the inclosure adjacent to the dike, flooding the land within the inclosure with water to a sufficient depth to support a dredge-boat, employing floating dredging-apparatus and therewith cutting relatively small drainage channels in the land, and finally withdrawing from the inclosure the water which submerges the land.

6. The method of reclaiming land which consists in floating a dredge-boat over the surface of the land, cutting drainage channels in the land and distributing the spoils in the water covering the land in the spaces between the drainage ditches, and finally withdrawing the water from the surface of the land.

JOHN W. SYKES.

In the presence of—
A. U. THORIEN,
R. A. SCHAEFER.